(No Model.)
J. BLY.
WALKING BEAM.
No. 409,385. Patented Aug. 20, 1889.
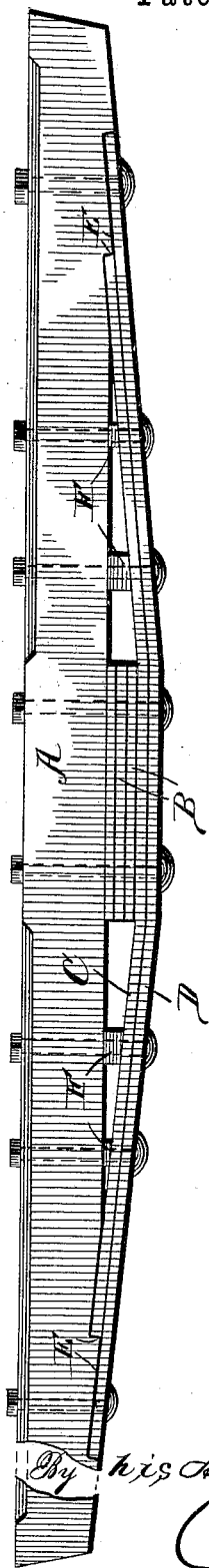
Witnesses
Henry G. Dieterich
E. J. Figgis
Inventor
John Bly,
By his Attorneys

United States Patent Office.

JOHN BLY, OF TIONA, PENNSYLVANIA.

WALKING-BEAM.

SPECIFICATION forming part of Letters Patent No. 409,385, dated August 20, 1889.

Application filed April 6, 1889. Serial No. 306,242. (No model.)

*To all whom it may concern:*

Be it known that I, JOHN BLY, a citizen of the United States, residing at Tiona, in the county of Warren and State of Pennsylvania, have invented a new and useful Walking-Beam, of which the following is a specification.

My invention relates to an improvement in walking-beams; and it consists in the peculiar construction and combination of devices, that will be more particularly set forth hereinafter.

The accompanying drawing is an elevation of a walking-beam embodying my improvements.

It is sometimes difficult to procure beams of timber of sufficient length and diameter to make a solid walking-beam, and I propose to make a walking-beam provided with a truss, whereby it will be as strong as one made of a solid piece of timber and very much less expensive. Under the center of the beam A, I place a block B of suitable length and of a width equal to that of the beam, and the said block may be either constructed of a single piece of material or it may be made of two or more pieces or longitudinal layers, as shown.

C D represent a pair of truss-boards, which are arranged one on top of the other and have their central portions bolted to the block B. The said boards are of unequal length, the lower boards D being longer than the upper boards C, and the ends of said boards are bent upward and fitted in scarfs or recesses E in the under side of the beam near the ends thereof, and are bolted to the beam, as shown. Blocks F of tapering form are arranged between the lower side of the beam and the boards and at suitable distances apart, and bolts are passed through the beam, through the said blocks, and through the truss-boards to secure the same together.

A beam thus constructed may be made of any size desired without the necessity of employing a piece of timber of abnormal size, and will be found extremely serviceable and equally as strong and durable as one made of a solid piece of timber.

Having thus described my invention, I claim—

1. A walking-beam comprising the beam A, a block arranged longitudinally under the beam at the center of the latter, and the truss-boards varying in length and having their centers secured to said block and their ends secured to the beam, substantially as described.

2. A walking-beam comprising the beam A, the block B, secured under the same at its center, and the truss-boards C D, arranged one on top of the other, having their central portions bolted to the block, and their ends bent upward and fitted in scarfs or recesses in the under side of the beam, substantially as described.

3. The beam, the block secured under the center of the same, said block being composed of one or more longitudinal boards or layers, and the truss-boards having their central portions bolted to and through the said block, and said beam and their ends fitted in scarfs or recesses in the under side of the beam near its ends, and bolted thereto, substantially as described.

4. A walking-beam comprising the beam A, the block secured under the center of the beam A, and being composed of one or more longitudinal boards or layers varying in length and having their central portions bolted to and through said block and beam A, and their ends fitted in scarfs or recesses in the under side of the beam near its ends, and bolted thereto, and the tapering blocks arranged between the truss-boards and the beam, substantially as described.

In testimony that I claim the foregoing as my own I have hereto affixed my signature in presence of two witnesses.

JOHN BLY.

Witnesses:
Mrs. J. B. CABLE.
W. V. N. YATES.